United States Patent
Flodin et al.

(10) Patent No.: US 9,033,119 B2
(45) Date of Patent: May 19, 2015

(54) DOUBLE DOGLEG WIDE STANCE BRAKE SHOE WEB

(75) Inventors: Troy Allen Flodin, Caledonia, MI (US); Thomas E. Lyon, Lawton, MI (US)

(73) Assignee: Bendix Spicer Foundation Brake LLC, Elyria, OH (US)

( * ) Notice: Subject to any disclaimer, the term of this patent is extended or adjusted under 35 U.S.C. 154(b) by 1961 days.

(21) Appl. No.: 12/175,919

(22) Filed: Jul. 18, 2008

(65) Prior Publication Data
US 2010/0012444 A1    Jan. 21, 2010

(51) Int. Cl.
| F16D 65/04 | (2006.01) |
| F16D 65/08 | (2006.01) |
| F16D 51/16 | (2006.01) |
| F16D 125/30 | (2012.01) |

(52) U.S. Cl.
CPC ............ F16D 65/08 (2013.01); *F16D 2125/30* (2013.01)

(58) Field of Classification Search
USPC ...... 188/250 C, 250 R, 250 D, 250 G, 250 B, 188/250 F, 258
See application file for complete search history.

(56) References Cited

U.S. PATENT DOCUMENTS

| 1,667,375 A | 4/1928 | Dodge |
| 1,680,911 A | 8/1928 | Loughead |
| 2,928,506 A | 3/1960 | Goldman |
| 2,928,510 A | 3/1960 | Kay |
| 3,877,141 A | 4/1975 | Bradshaw et al. |
| 4,360,959 A | 11/1982 | Johannesen |
| 4,732,240 A | 3/1988 | Flaim |
| 4,773,512 A | 9/1988 | Murakami |
| 4,858,730 A | 8/1989 | Baroni |
| 5,515,952 A | 5/1996 | Jackson |
| 6,336,533 B1 | 1/2002 | Pollock et al. |
| 6,415,896 B1 | 7/2002 | Arai |

FOREIGN PATENT DOCUMENTS

| DE | 3818235 A1 | 11/1989 | |
| JP | 59040024 A | * 3/1984 | .............. F16D 65/08 |

OTHER PUBLICATIONS

Bendix Spicer Foundation Brake LLC slide 1—Standard ES Brake—open anchor pin end.
(Continued)

*Primary Examiner* — Xuan Lan Nguyen
(74) *Attorney, Agent, or Firm* — Crowell & Moring LLP

(57) ABSTRACT

A drum brake shoe has first and second webs, with the first web including a first end section to be located adjacent a brake shoe actuation element, a second end section to be located adjacent a brake shoe anchor element, and a central section extending between the first and second end sections. Similarly, the second web includes a first end section to be located adjacent the brake shoe actuation element, a second end section to be located adjacent the brake shoe anchor element, and a central section extending between the first and second end sections of the second web. At least one lining table is disposed at circumferentially outer portions of the first and second webs, and a pin or other return spring mounting is provided by at least the first web. The brake shoe is particularly configured so that a brake shoe return spring, which is connectable to the return spring mounting, is positioned so that a center line of the return spring is offset from an axial center line of the lining table but located axially inboard of an outside edge of the second end section of the first web.

20 Claims, 5 Drawing Sheets

(56) References Cited

OTHER PUBLICATIONS

Bendix Spicer Foundation Brake LLC slide 2—ES "H" brake (heavy duty)—closed anchor pin end, replaceable anchor pin.
Bendix Spicer Foundation Brake LLC slide 3—Argentina ES brake—plates added to hold shoes to anchor pin.
International Search Report dated Aug. 20, 2009 (Three (3) pages).
PCT/ISA/220 (Two (2) pages).
PCT/ISA/237 Written Opinion of the International Searching Authority (Four (4) pages).
Russian Federation Office Action dated May 4, 2013, including English-language translation (Five (5) pages)).

\* cited by examiner

DOUBLE DOGLEG WIDE STANCE BRAKE SHOE WEB

BACKGROUND OF THE INVENTION

1. Field of the Invention

This invention concerns "foundation" brakes provided with drum brake shoe webs that are angled, or that "dogleg," at anchor ends to establish more stable stances on drum brake anchor pins. The invention can be utilized in conjunction with standard drum brakes already in use, but is especially advantageous and cost effective when used in configurations having offset return springs.

2. Description of Related Art

An offset return spring configuration adds side loading to drum brake shoes and forces ends of the shoes to lift off of the anchor pin. Since a drum brake using an off-centerline return spring has unbalanced forces, the brake shoes tend to "rock" or tilt and lift off from one side of the anchor pin. Tilting of drum brake shoes in this manner causes many technical issues.

Brake shoes that somehow capture the anchor pin are currently used to eliminate this rocking or tilting. This is generally done by having a fully captured anchor pin. A web with a full 360° circle that hangs on to the anchor pin and keeps a shoe from lifting off is common.

In another way of capturing an anchor pin, four additional plates are used. These plates have two holes, with one of the holes designed to slip over the anchor pin and another of the holes designed to slip over a pin at the return spring hole. These plates "scissor," so that each shoe has a plate on both sides (four plates per wheel end). The plates also keep the shoes from lifting off.

U.S. Pat. No. 1,667,375 to Dodge discloses a dogleg web shoe design intended to minimize manufacturing costs by having a set of dogleg-shaped pressed arms.

U.S. Pat. No. 2,928,510 to Kay concerns a brake shoe design in which anchor points on the web are also locating points for a spring to minimize brake distortion.

U.S. Pat. No. 4,773,512 to Murakami discloses a drum brake shoe with multiple reinforcement flanges to reduce noise. The flanges are paired over the length of the web to increase torsional rigidity and reduce noise.

German patent document DE 3818235 to Martin discloses a brake shoe web body that doglegs twice, but not in the same pattern. The purpose of the Martin pattern is to save weight.

U.S. Pat. No. 2,928,506 to Goldman discloses brake shoes with a central bridge on each shoe on which a return spring is affixed. This configuration improves anchor pin wear.

U.S. Pat. No. 3,877,141 to Bradshaw et al. concerns a method to make brake shoes with a single dogleg-style rib. The dogleg is added to improve casting.

U.S. Pat. No. 4,360,959 to Johannesen relates to a method for making a brake shoe from a single blank. Manufacturing is simplified by way of a dual rib feature, because welding is eliminated.

U.S. Pat. No. 4,732,240 to Flaim concerns a method to stabilize and improve drum brakes by changing brake pad lengths.

U.S. Pat. No. 5,515,952 to Jackson discloses a brake shoe with mass damping weights attached to reduce noise.

Finally, U.S. Pat. No. 6,336,533 to Pollock et al. shows a special spring mounted between web flanges to reduce noise and smoothly apply the lining to the drum.

SUMMARY OF THE INVENTION

In a drum brake shoe with first and second webs according to the invention, the first web has a first end section to be located adjacent a brake shoe actuation element, a second end section to be located adjacent a brake shoe anchor element, and a central section extending between the first and second end sections. Similarly, the second web includes a first end section to be located adjacent the brake shoe actuation element, a second end section to be located adjacent the brake shoe anchor element, and a central section extending between the first and second end sections of the second web. At least one lining table is disposed at circumferentially outer portions of the first and second webs, and a pin or other return spring mounting is provided by at least the first web. The brake shoe is particularly configured so that a brake shoe return spring, which is connectable to the return spring mounting, is positioned so that a center line of the return spring is offset from an axial center line of the lining table but located axially inboard of an outside edge of the second end section of the first web.

In certain preferred configurations, the first end section, the second end section, and the central section of each brake web extend substantially parallel to each other. Each brake web may include a first offset section, disposed between the first end section and the central section, and a second offset section, disposed between the central section and the second end section, so that the first end section, the central section, and the second end section lie in different parallel planes. The first and second offset sections may extend in planes defining acute angles relative to these parallel planes.

One significant feature of this design is that the stance of the webs at the anchor pin is wider than the amount that the return spring is away from a return spring centerline. The centerline of the offset spring thus falls in between the two outside edges of the widened webs at the anchor pin. Variations may have straight or tapered webs that stand much wider on anchor pins. Advantages provided by this configuration include minimizing brake shoe rocking and reductions in vibration and noise.

While stamped brake shoe webs have had doglegs at their cam ends before, providing doglegs at anchor pin ends of brake shoe webs is considered new. Adding doglegs for the purpose of stabilizing the brake shoes on the pins is also considered new, and the manner in which shoe rocking is prevented according to the present invention is additionally considered different from previous methods. Through its different web body portion, the present invention improves torsional strength. The more stable brake shoe anchor pin ends resulting facilitate stable reactions to braking forces, make such reactions more predictable, and reduce vibration and noise.

By doglegging at its anchor end, a brake shoe web according to the invention can establish a more stable stance on the anchor pin. This advance can be used with standard brakes today, but, again, produces a major advantage when using an offset return spring that adds side loading to the shoes and forces them to lift off of the anchor pin.

Wider stances on drum brake anchor pins could be achieved adding tapers or doglegging to webs at anchor ends, or by bolting, welding, gluing, pressing, or otherwise attaching or forming additional plates on sides of currently used webs. These configurations would also address the purposes of the invention, which are to reduce brake vibration and noise, establish more stable reactions to brake torque, and prevent offset return springs from causing the shoes to rock on anchor pins. A double dogleg shoe or wide stance shoe solves the rocking shoe problem more simply and effectively than captured anchor pins, which become expensive and difficult to service.

Web manufacture is considered very similar to that of single dogleg webs used today. For a stamped shoe, a web shape is stamped out of a sheet with a conventional or fine blanking press. The web shape could also be produced by way of water jet, wire, EDM, or laser cutting from an appropriate sheet. The shape would then be formed in a die to add the doglegs. Today, a single dogleg configuration is used, and so a slightly more complicated tool will be required. The bend could be a single, gentle taper, two 90° bends, or anything in between. In addition to the dogleg, there could simply be additional material bolted, welded, pinned, or pegged to a currently used web to get the wider stance.

The feature could be added to fabricated (welded) shoes (full filet, stitch welded, puddle or projection welded), or added to hot staked shoes.

Any stamped brake shoe could have double doglegs added. The table could be added in any of the ways mentioned, namely welding, hot staking, etc. Generally, various grades of steel have been used in the fabricated shoes. Again, additional material could alternatively be bolted on to provide the wider stance.

The invention also concerns any reaching of the webs to create a wider stance and, in general, the elimination of both expensive plates that pin on and captured anchor pins.

The present invention provides a cost effective way to solve the problem at issue, and shoes with two doglegs in them are not known. The solution proposed has apparently not been proposed previously because it is difficult to achieve a wide base due to clearance to the brake spider at full shoe collapse. Also, captured anchor pins were used in the past and are common, and straight webs are generally preferred for cost reasons. Finally, very few offset springs are used because of the issues associated; this fixes the problems so the spring can be used.

The wide stance of the brake shoe of the invention increases a lever arm that must be overcome by an offset return spring to cause the shoe to rock or lift off.

The issues addressed by the present invention are present whenever a non-centered return spring is used. Most of the time, a centered return spring is used. This symmetry of loading is optimal, but, in some cases, impossible. When a design forces an offset spring, the problems addressed by this invention are present.

Again, the present design provides a low cost, low risk design with no extra parts required, is easy to service, and is compatible with most common drum brake designs used today.

Wider webs create more rigid support under thin brake shoe tables so that those tables are not permitted to bend easily.

DETAILED DESCRIPTION OF THE INVENTION

Figure 1:
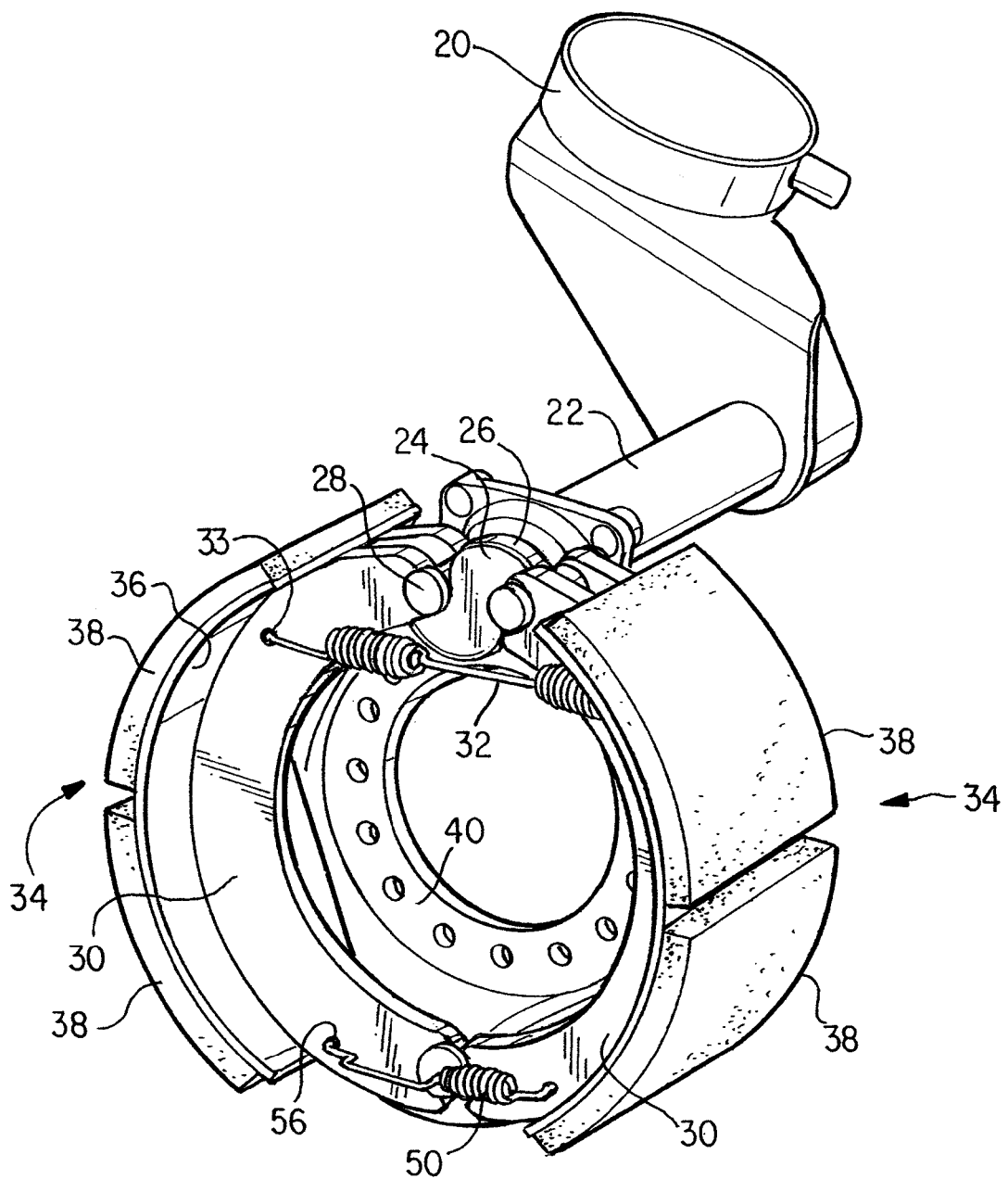
FIG. 1 is a perspective view of a known drum brake configuration.

FIG. 1 shows one conventional drum brake configuration in which drum brake shoe webs according to this invention are useable. The configuration in FIG. 1 includes an air or hydraulic fluid actuator 20 interconnected by a lever arrangement to a rotatable shaft extending through a sleeve 22. The rotatable shaft terminates in a double sided cam 24 having cam surfaces 26. Cam follower bearings 28, which, if preferred, could be configured as rollers, are mounted to actuated ends of a pair of drum brake shoes 34 in a conventional manner. Each bearing 28 is positioned so as to engage a corresponding cam surface 26 under a spring bias applied by a return spring 32. Ends of the return spring 32 are received in holes 33 defined adjacent the actuated ends of the drum brake shoes 34.

Figure 2:
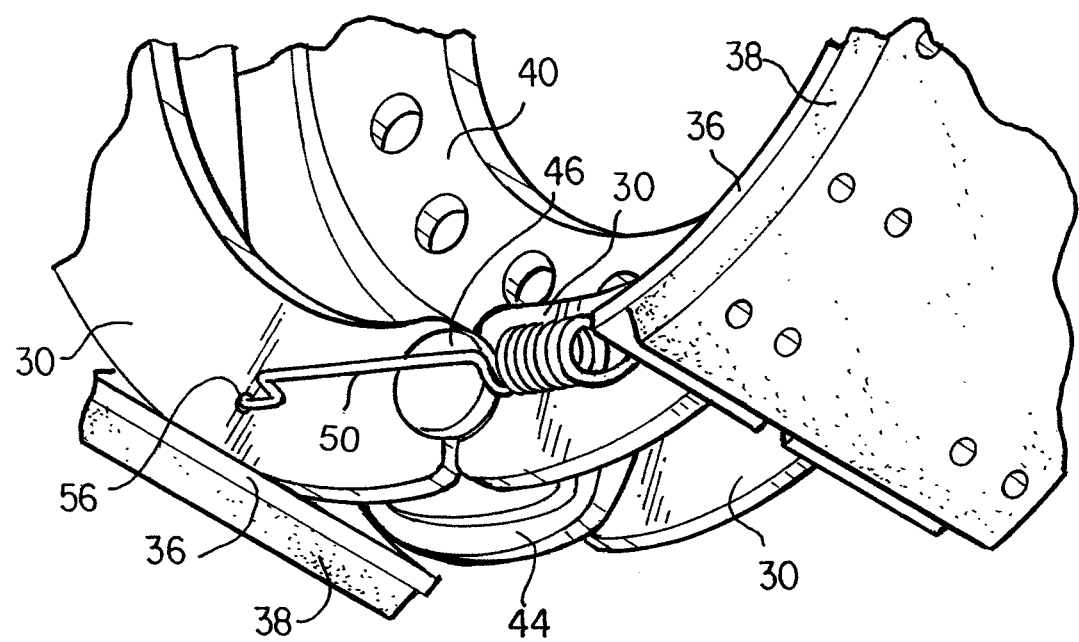
FIG. 2 is an enlarged perspective view of the anchor pin assembly of FIG. 1 as well as of certain elements adjacent to that anchor pin assembly.

As shown in FIGS. 1 and 2, each drum brake shoe 34 includes a pair of parallel brake shoe webs 30. A part-circular lining table 36 is formed together with or secured to each pair of parallel webs 30, and friction linings 38 are riveted or otherwise secured to each lining table.

A stationary backing plate 40, securable to an axle housing or other fixed vehicle structure, supports an anchor structure 44, the sleeve 22, and various other components of the overall drum brake assembly shown in FIG. 1. The anchor structure 44 is secured in suitable fashion (e.g. by bolts, rivets, welds, brazing, etc.) to the backing plate, or may be integrally cast or otherwise formed together with the backing plate. The structure 44 supports or defines an anchor element 46, such as an anchor pin or anchor pins, against which anchored ends 48 of the drum brake shoes 34 abut. The anchored ends 48 of the drum brake shoes are biased into engagement with the anchor element 46 by anchor springs 50 extending between and secured to opposing webs 30 of the brake shoes 34. Only one of these anchor springs 50 is visible in the views provided by FIGS. 1 and 2. Ends of the anchor springs 50 are received in holes 56 in the webs 30 defined adjacent to the anchored ends of the drum brake shoes 34 that abut the anchor element 46.

Figure 3:
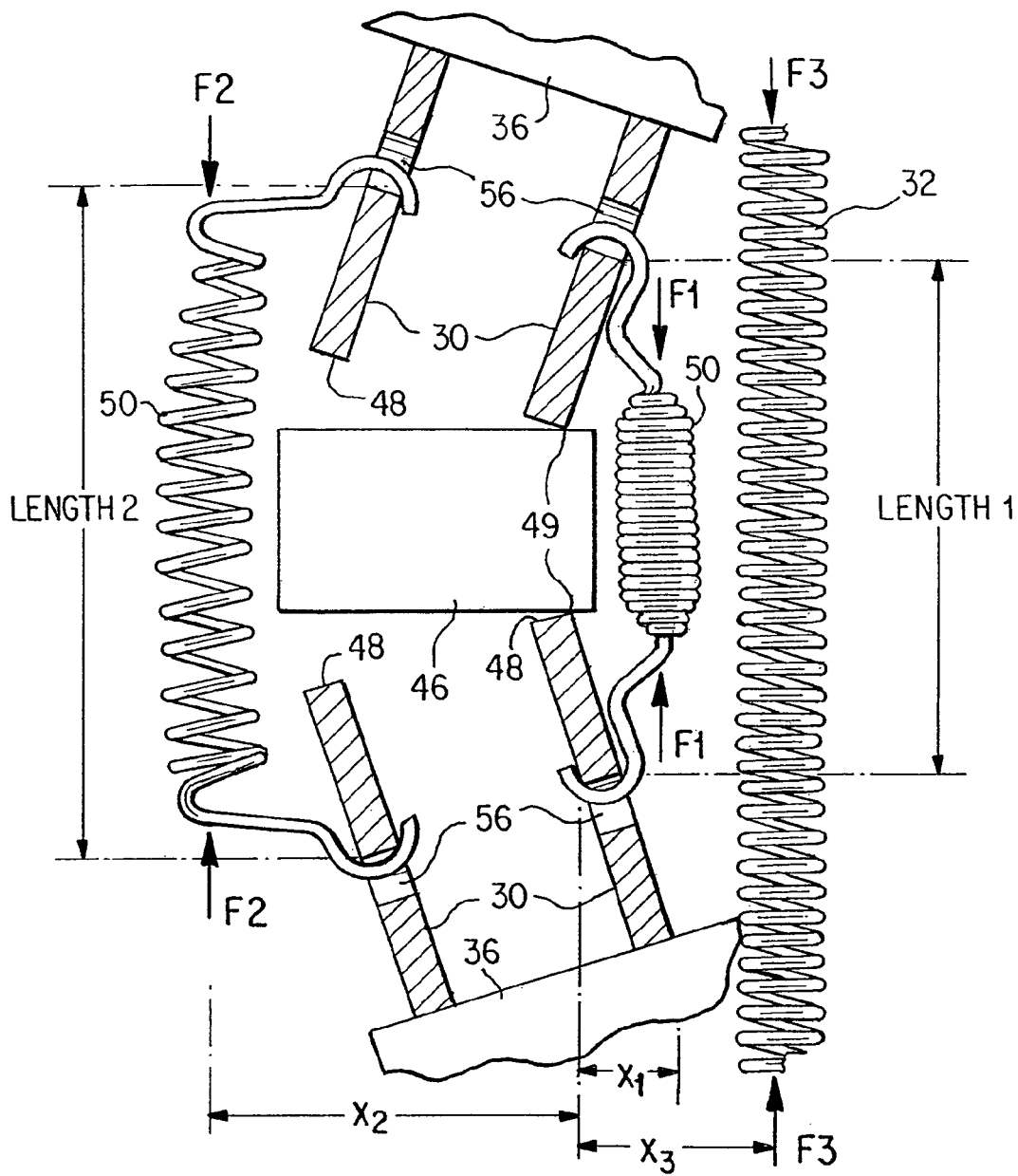
FIG. 3 is a simplified view from below an arrangement similar to that of FIGS. 1 and 2 that is intended to facilitate an understanding of problems associated with conventional drum brake configurations.

FIG. 3 is a simplified view from below an arrangement similar to that illustrated in FIGS. 1 and 2 in which the anchor springs 50, the anchor element 46, and the return spring 32 are all illustrated schematically. Certain problems associated with a conventional drum brake configuration such as that shown in FIGS. 1 and 2 will be apparent from the following discussion when considered in conjunction with FIG. 3. These problems are exacerbated when attempts are made to use a pin-mounted offset return spring, such as that to be described, instead of a return spring, such as the spring 32 illustrated in FIGS. 1 and 2, having ends that hook into openings 56 defined in the webs 30.

In the configuration represented in FIG. 3, the force F1 imposed on opposing webs 30 by the right, outboard side anchor spring 50 is largely balanced by the force F2 imposed on opposing webs 30 by the left, inboard side anchor spring 50.

The illustrated configuration, however, does not include any inboard return spring corresponding to the outboard return spring 32. The force F3 imposed on the outboard pair of opposing webs therefore produces a torque $F3 \cdot X_3$ that tends to cant or tilt the opposing outboard webs 30, lift the anchored ends 48 of the inboard opposing web pair off of the anchor element 46, and rotate those outboard webs 30 about contact points 49. Vibration produced by vehicle operation, impacts caused by uneven road surfaces or obstacles on road surfaces, and so on exacerbate this tendency, resulting in displacement of the inboard anchored ends 48 from the element 46 as shown. As this occurs, the inboard anchor spring length "LENGTH 2," at times, becomes larger than the outboard anchor spring length "LENGTH 1," with the torque $F3 \cdot X_3$ offset, and at times balanced, by the torque difference $F2 \cdot X_2 - F1 \cdot X_1$. An increase in brake web anchored end stability is desirable to promote even lining wear, avoid anchor spring deterioration or failure due to fatigue, and minimize other adverse effects of the illustrated offset brake shoe loading.

Figure 4:
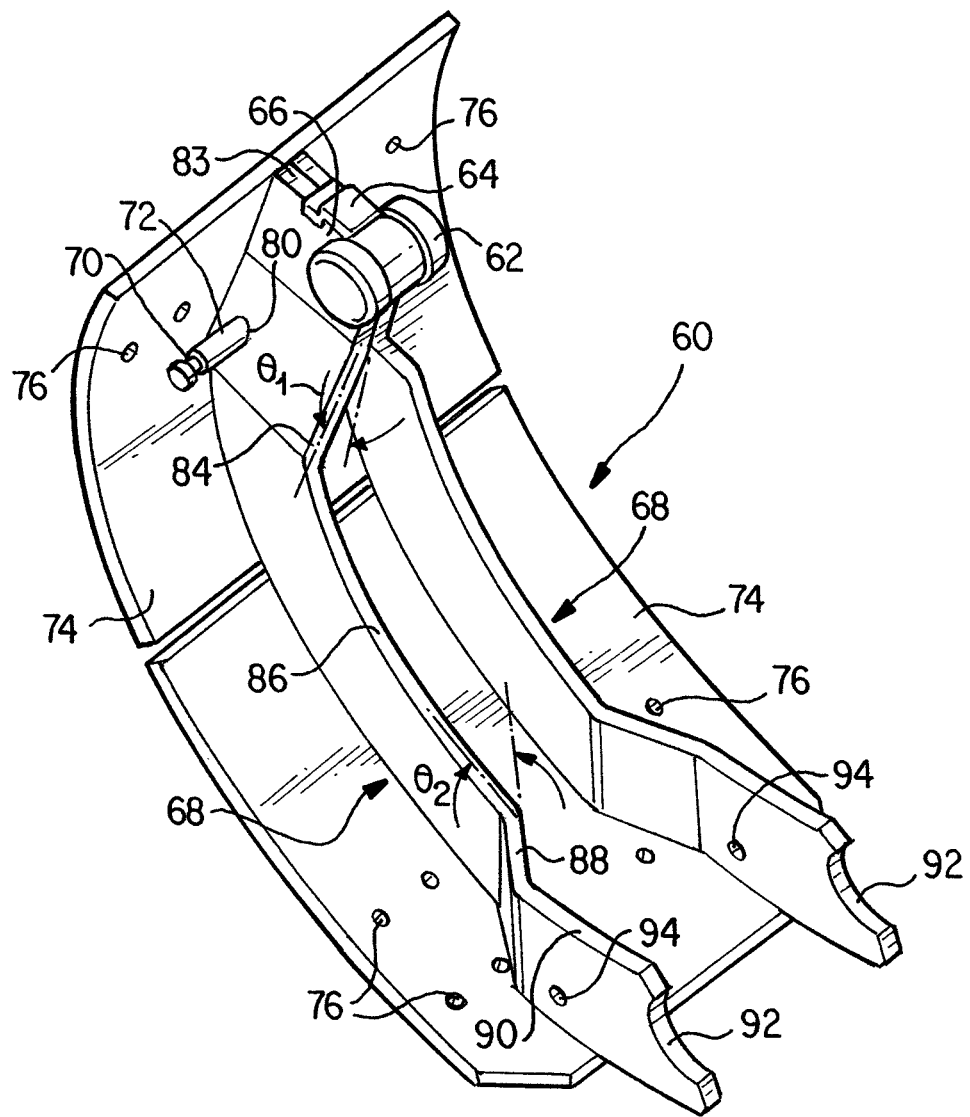
FIG. 4 is a perspective view of a drum brake shoe according to one embodiment of the invention.

FIG. 4 is a perspective view of a drum brake shoe 60 according to one embodiment of the invention. A pair of the drum brake shoes 60 are useable in place of conventional shoes, such as the shoes 34 shown in FIG. 1, although certain modifications, such as elongation of the anchor element, might be necessary.

Each shoe 60 includes a cam follower bearing 62. In this configuration, the cam follower bearing 62 is configured as a roller, mounted by clips 64 to protruding sections 66 of first and second brake shoe webs 68 (identified here also as "double dogleg" brake shoe webs) as will be described. Each bearing 62 is positioned so as to engage a corresponding cam surface under a spring bias applied by a return spring 32' (FIG. 5) in a manner similar to the bearings 28 of the conventional drum brake configuration shown in FIGS. 1 and 2. Ends of the return spring, which is not shown in FIG. 4, are receivable in grooves 70 defined adjacent outboard ends of a return spring mounting, here formed by a spring mounting pin 72, rather than in holes defined in webs of the drum brake shoes as shown in FIGS. 1-3. The pin 72, of course, could be omitted, if desired; in this case, ends of the return spring could be secured within opposing holes 80, which will be described in more detail later and which in this case would form the return spring mounting.

FIG. 4 also illustrates part-circular lining tables 74 formed with, welded or brazed to, or otherwise secured on the illustrated pair of webs 68. Friction linings (not shown in FIG. 4) can be secured to the lining tables by way of rivets, screws, or other types of fasteners passing through table holes 76, adhesively, etc. A pair of lining tables 74 is shown in FIG. 4, although a single lining table or more than two lining tables could be utilized if desired.

The brake shoe webs 68 associated with the drum brake shoe 60 shown in FIG. 4 essentially form mirror images of each other. In the illustrated configuration, viewed radially from within the shoe 60, starting at a first, actuated end section 83 forming the protruding section 66, each web 68 includes a first offset section 84, extending laterally from a plane containing the actuated end section 83 at an angle $\theta^1$ greater than 0°, to a central section 86 that, as shown, extends in a plane approximately parallel to the plane in which the actuated end section 83 extends. The central section 86 of the web terminates at a second offset section 88, which extends laterally from the central section 86 at an angle $\theta_2$ greater than 0°, and which terminates at a second, anchored web end section 90 that extends in another plane approximately parallel to the planes in which the central web section 86 and the actuated end section 83 extend.

The second end section 90 forms anchored drum brake shoe ends 92 that are biased into engagement with an anchor pin or other anchor element (not shown in FIG. 4). The webs 68 are provided with holes 94, in which ends of anchor springs (not shown in FIG. 4) are receivable to bias the brake shoe ends 92 into contact with the anchor element as described.

As illustrated, the angles $\theta_1$ and $\theta_2$ are roughly 30°, but a wide range and variety of acute or other angles is clearly useable. It will be recognized that each angle $\theta_1$ and $\theta_2$ produces an angled portion or "dogleg" in the brake shoe web. Straight webs that expand from the actuated end section to the anchored drum brake shoe ends could alternatively be used, as could tapered webs; it is necessary, however, to be sure that the anchored drum brake shoe ends stand adequately far apart on the anchor pin or other anchor element so that the centerline of the offset return spring falls between the two outside edges of the brake shoe web sections in a manner such as that shown in FIG. 5.

Figure 5:
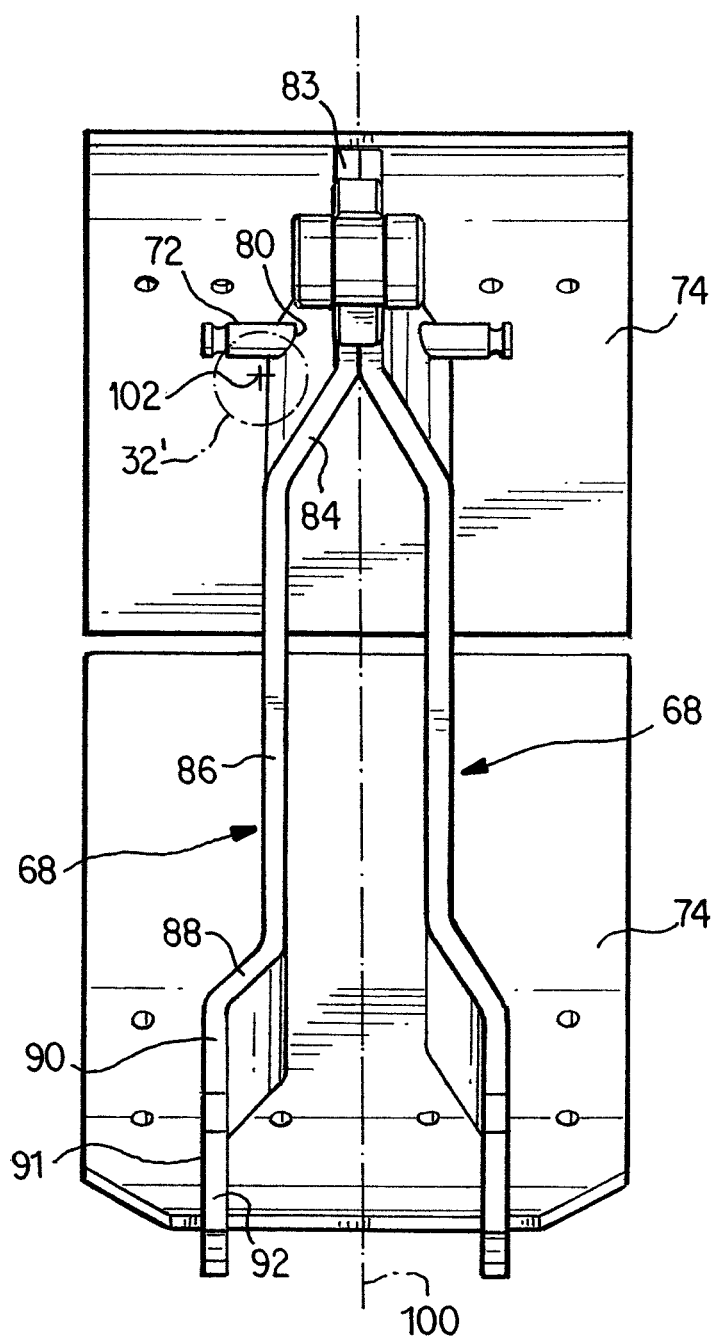
FIG. 5 is a view of the drum brake shoe of FIG. 4 showing relationships between a return spring center line, an axial center line of brake shoe lining tables, and an outside edge of an end section of the brake shoe web.

Referring now to the view provided by FIG. 5, the spring mounting pin 72 mentioned previously is shown as extending through holes 80 provided in opposing first offset sections 84 of adjacent brake shoe webs 68. The pin 72 may be welded, brazed, or otherwise secured in place in the holes 80. Separate pins could be respectively mounted in the holes 80 if desired. Alternatively, a single mounting pin extending only through an outboard hole 80 could be used. As mentioned previously, moreover, the spring mounting pin 72 could be omitted, if desired; in this case, ends of the return spring 32' could be secured within the holes 80 defined in opposing drum brake shoes 60.

A return spring mounting is provided by at least one of the webs 68, since an end of the return spring is mounted either on a pin 72 or within a hole 80 of that web. The brake shoe return spring 32' is connectable to this return spring mounting such that a return spring center line 102 is offset from an axial center line 100 of the lining tables 74 but located axially inside or inboard of an outside edge 91 of the second end section 90 of the web 68 mentioned.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A drum brake shoe comprising:
   a first web including a first end section to be located adjacent a brake shoe actuation element, a second end section to be located adjacent a brake shoe anchor element, and a central section extending between the first and second end sections of the first web;
   a second web including a first end section to be located adjacent said brake shoe actuation element, a second end section to be located adjacent said brake shoe anchor element, and a central section extending between the first and second end sections of the second web;
   at least one lining table disposed at circumferentially outer portions of the first and second webs; and
   a return spring mounting, provided by at least said first web, to which a brake shoe return spring is connectable with a return spring center line that is offset from an axial center line of said at least one lining table and located axially between an outside edge of the central section of the first web and an outside edge of the second end section of said first web.

2. The drum brake shoe according to claim 1, wherein the first end section, the second end section, and the central section of each brake web extend substantially parallel to each other.

3. The drum brake shoe according to claim 2, wherein each brake web includes a first offset section, disposed between the first end section and the central section, and a second offset section, disposed between the central section and the second end section, so that the first end section, the central section, and the second end section lie in different parallel planes.

4. The drum brake shoe according to claim 1, wherein the return spring mounting is defined by a pin affixed to said first web.

5. The drum brake shoe according to claim 4, wherein the pin is affixed to both said first web and said second web.

6. The drum brake shoe according to claim 3, wherein the first and second offset sections extend in planes defining acute angles relative to said parallel planes.

7. The drum brake shoe according to claim 1, wherein each brake web includes a first offset section, disposed between the first end section and the central section, and a second offset section, disposed between the central section and the second end section.

8. The drum brake shoe according to claim 7, wherein the first end section, the second end section, and the central section of each brake web extend substantially parallel to each other.

9. The drum brake shoe according to claim 2, wherein the return spring mounting is defined by a pin affixed to said first web.

10. The drum brake shoe according to claim 3, wherein the return spring mounting is defined by a pin affixed to said first web.

11. A drum brake comprising:
a shoe having a first web including a first end section to be located adjacent a brake shoe actuation element, a second end section to be located adjacent a brake shoe anchor element, and a central section extending between the first and second end sections of the first web, a second web including a first end section to be located adjacent said brake shoe actuation element, a second end section to be located adjacent said brake shoe anchor element, and a central section extending between the first and second end sections of the second web, and at least one lining table disposed at circumferentially outer portions of the first and second webs; and
a brake shoe return spring mounted to at least said first web with a return spring center line that is offset from an axial center line of said at least one lining table and located axially between an outside edge of the central section of the first web and an outside edge of the second end section of said first web.

12. The drum brake according to claim 11, wherein the first end section, the second end section, and the central section of each brake web are substantially parallel to each other.

13. The drum brake according to claim 12, wherein each brake web includes a first offset section, disposed between the first end section and the central section, and a second offset section, disposed between the central section and the second end section, so that the first end section, the central section, and the second end section lie in different parallel planes.

14. The drum brake according to claim 11, wherein the return spring mounting is defined by a pin affixed to said first web.

15. The drum brake according to claim 14, wherein the pin is affixed to both said first web and said second web.

16. The drum brake according to claim 13, wherein the first and second offset sections extend in planes defining acute angles relative to said parallel planes.

17. The drum brake according to claim 11, wherein each brake web includes a first offset section, disposed between the first end section and the central section, and a second offset section, disposed between the central section and the second end section.

18. The drum brake according to claim 17, wherein the first end section, the second end section, and the central section of each brake web extend substantially parallel to each other.

19. The drum brake according to claim 12, wherein the return spring mounting is defined by a pin affixed to said first web.

20. The drum brake according to claim 13, wherein the return spring mounting is defined by a pin affixed to said first web.

* * * * *